(12) United States Patent
Bhatt et al.

(10) Patent No.: US 10,904,758 B2
(45) Date of Patent: Jan. 26, 2021

(54) SECURE METHOD FOR CONFIGURING INTERNET OF THINGS (IOT) DEVICES THROUGH WIRELESS TECHNOLOGIES

(71) Applicant: SAMSUNG ELETRÔNICA DA AMAZÔNIA LTDA., São Paulo (BR)

(72) Inventors: Parth Bhatt, Campinas (BR); Nelson Uto, Campinas (BR); Anderson Nunes Paiva, Campinas (BR)

(73) Assignee: SAMSUNG ELETRÔNICA DA AMAZÔNIA LTDA., São Paulo (BR)

( * ) Notice: Subject to any disclaimer, the term of this patent is extended or adjusted under 35 U.S.C. 154(b) by 100 days.

(21) Appl. No.: 16/375,483

(22) Filed: Apr. 4, 2019

(65) Prior Publication Data

US 2020/0169886 A1  May 28, 2020

(30) Foreign Application Priority Data

Nov. 23, 2018  (BR) ...................... 10 2018 074209 4

(51) Int. Cl.

| | |
|---|---|
| G06F 21/00 | (2013.01) |
| H04W 12/06 | (2009.01) |
| H04W 12/08 | (2009.01) |
| H04W 12/10 | (2009.01) |
| H04W 12/00 | (2009.01) |
| H04W 12/12 | (2009.01) |
| G06K 7/14 | (2006.01) |
| H04L 29/06 | (2006.01) |

(52) U.S. Cl.
CPC ...... *H04W 12/0609* (2019.01); *G06K 7/1417* (2013.01); *H04W 12/0017* (2019.01); *H04W 12/0023* (2019.01); *H04W 12/0027* (2019.01); *H04W 12/08* (2013.01); *H04W 12/1002* (2019.01); *H04W 12/1204* (2019.01); *H04L 63/0428* (2013.01); *H04L 63/1458* (2013.01)

(58) Field of Classification Search
CPC ............ H04L 63/0428; H04L 41/0806; H04L 63/1425; G06F 3/167; G06F 1/1698; G06F 1/28
See application file for complete search history.

(56) References Cited

U.S. PATENT DOCUMENTS

| | | |
|---|---|---|
| 9,426,153 B2 | 8/2016 | Kim et al. |
| 2011/0150266 A1 | 6/2011 | Hohndel |
| 2017/0111788 A1 | 4/2017 | Cotta |
| 2017/0353981 A1 | 12/2017 | Lee et al. |

*Primary Examiner* — Ghazal B Shehni

(57) ABSTRACT

A method to configure a new IoT device using a smartphone with the IoT device configuration application/service installed. Once the user has added the configuration preferences after successful login to his account on the cloud service using secure communication channel (such as TLS), the user can scan the QR code printed on the device/paper shipped together with the device. After the QR code is scanned, the mobile application decodes the data contained in the QR code, verifies the digital signature, and automatically enables a Wi-Fi hotspot on the smartphone, based on the information retrieved from the QR code. Then, the mobile application informs the user to switch on the IoT device. Once the IoT device is turned on and boots completely, it connects to the hotspot on the smartphone using the default Wi-Fi SSID and PSK saved in its memory (the same as on the QR code).

5 Claims, 5 Drawing Sheets

SECURE METHOD FOR CONFIGURING INTERNET OF THINGS (IOT) DEVICES THROUGH WIRELESS TECHNOLOGIES

CROSS-REFERENCE TO RELATED APPLICATIONS

This application claims the foreign priority benefit of Brazilian Patent Application No. 10 2018 0742094, filed on Nov. 23, 2018 in the Brazilian Intellectual Property Office, the disclosure of which is incorporated herein by reference.

FIELD OF THE INVENTION

The present invention refers to a method for configuring IoT devices. It enables users to securely associate their IoT devices to the network gateway or master/controller device, such as an internet access point (router), improves the usability as compared to other known solutions and does not rely on user knowledge for security configuration process. Furthermore, the proposed method guarantees genuineness of the IoT device and secure exchange of security parameters and cryptographic keys between infrastructure entities during configuration and reconfiguration of the device. The method can be applied to IoT devices supporting different communication protocols that are commonly found on IoT devices.

BACKGROUND

In the current state of art, there are manually configured solutions that use similar methods for initial device setup, most of which use Wi-Fi hotspot, Bluetooth, and NFC technologies. The Bluetooth technology is used by devices like Nest Camera and Awair Air Quality Monitor and NFC Technology has also been proposed by some research works and patents, but both of them require specific hardware for device configuration purposes. It increases attack surface and costs related to device manufacturing.

The Wi-Fi hotspot is one of the commonly found technology. It is used by several companies, but their configuration process consists in enabling the Wi-Fi hotspot on the IoT device.

The Amazon AWS button available at "https://docs.aws.amazon.com/iot/latest/developerguide/configure-iot.html" hosts a Wi-Fi hotspot and the configuration application web page on it. A smartphone is used to connect and access the application web page to configure this device. In this case, the Amazon AWS button, which completely relies on its unreplaceable battery for power, will be spending it for hosting configuration services instead of its judicious use and perform the main function of the device. Thus, these devices are easy targets for Denial of Service (DoS) attacks because of flawed concept of hosting such services on resource constrained devices.

Additionally, most of these devices use, for their Wi-Fi hotspots, default pre-shared keys (PSK) that are commonly part of the serial/model number printed on the device itself. The use of default passwords is a common vulnerability, as anyone who has knowledge of serial/model number of the device or physical access to the device can configure and/or reconfigure the device. Furthermore, some devices can be completely reconfigured if the attacker has physical access to it. The method of the present invention eliminates all the aforementioned security vulnerabilities found in these related device setup technologies and improves on usability as well.

According to the survey published by Kaspersky, the number of internet-connected devices, also known as Internet of Things (IoT) devices has already reached 6.2 per household, considering major developed and developing economies around the world, available at https://index.kaspersky.com/metrics/deviceusage, and the total number of such devices worldwide is 8.4 billion. Eventually, most of the electronic devices surrounding us are being connected to the internet, and it is quite well reflected in the predictions published by Gartner at https://www.gartner.com/newsroom/id/3598917. It is predicted that in next two years, there will be 20 billion connected devices, which is double the number of devices that are present today. Meanwhile, the configuration/setup of connected devices still is a challenge for many non-technical users and many of them do not have sufficient information security awareness. It exposes large part of users around the world to security threats and has being recently demonstrated by attacks based on Mirai Botnet and the Bricketbot. The Mirai botnet has been known to have infected thousands of devices such as IP cameras, routers, DVRs, and printers and have used them to launch large scale Distributed Denial of Service (DDoS) reaching speeds of more than 600 Gbps, according to http://mdbailey.ece.illinois.edu/publications/usesec17 mirai.pdf. Vulnerabilities in IoT devices not only impact the users themselves but also become disruptive for the entire internet infrastructure. Therefore, security is of paramount importance for IoT devices. Additionally, because of security and usability tradeoff, there is a high chance that usability worsens while security improves and when considering large number of IoT devices per person to be configured securely, both must be balanced properly.

Hence, there is need of an easy to use configuration/setup solution for IoT devices that provides high security even if the users are non-technical and unaware about security concepts. The present invention perfectly addresses this problem and provides a solution that can satisfy such needs of the users and the market. The present invention is based only on the hardware/software technologies that are commonly found in IoT devices and can be quickly implemented.

The patent document U.S. 2011/0150266 A1, titled "AUTOMATED SECURITY CONTROL USING ENCODED SECURITY INFORMATION", by HOHNDEL DIRK, filed on Dec. 22, 2009, describes an automatic method for security configuration of an external device which uses a camera connected to the device. The camera captures an image of a multi-dimensional code, for example a QR code. This multi-dimensional code contains information that is employed to configure security parameters to provide network access on the external device, for instance, the network SSID and encryption keys or pass phrases. Then, the external device is able to connect to the network. Differently from document U.S. 2011/0150266 A1, in the proposed method, there is no need of a camera or scanner associated with the device under configuration for the security and wireless network setup.

The patent document U.S. 2017/0111788 titled "Secure Device Pairing", by SONY COMPUTER ENTERTAINMENT AMERICA LLC, filed on Oct. 14, 2015, discloses a secure device pairing method in which a machine readable QR code is scanned on the display of a server device by a mobile communication device, or a short human-readable passcode is presented on the display of the server device for reading and human input in the mobile device's User Interface (UI). So, the mobile device computes a response and returns it to the server device. If the response is correct, Wi-Fi setup information, which can include personally identifiable information (PII), is exchanged in an encrypted form between the two devices to support subsequent Wi-Fi communication.

In patent document U.S. 2017/0111788 A1, a pseudorandom key, shared with the mobile device, is combined with a pseudorandom challenge, transmitted to the mobile device using Wi-Fi communication, in order to compute a response by the mobile device, then proceed with the exchange of communication keys and Wi-Fi information in case the response matches a test value computed according to the function: test value=f(key, challenge).

The patent document U.S. Pat. No. 9,426,153 B2 titled "SETUP OF MULTIPLE IOT DEVICES", by BELKIN INTERNATIONAL INC, filed on Oct. 31, 2014, describes a method in which an existing access device, for instance, a smartphone connected to the network, transmits network credentials identifying a network gateway in a local area network, to a new network device for the purpose of adding this new device to the network. In this method, the new device configures a setup access point, e.g., a Wi-Fi access point, so the access device can connect to it, then it sends or broadcasts identification information to the rest of the local area network (including the access device) in an automatic way (upon being powered on) or in response to a discovery request from the access device. An application executed by the access device receives the identification information from the new device, then the user selects the new device, and the new device sends to the access device a list of gateways (e.g. SSIDs) that it has detected. The user selects the gateway with which he/she wishes for the new network device to pair. The access device prompts the user to enter login information of the gateway. Once the user has entered login information, the access device sends the login information to the new network device. Finally, the new network device uses the login information to pair and communicate with the selected gateway.

In U.S. Pat. No. 9,426,153 B2, the new device to be configured creates a wireless setup access point and the access device, i.e., the smartphone, connects to the new device, which in turn transmits its identification information (the name of the network device) to the smartphone that proceeds with the setup of the new device network. In addition, security aspects such as verification of validity of the new device using the manufacturer's digital signature and exchange of cryptographic keys between devices are not covered in U.S. Pat. No. 9,426,153 B2.

The patent document U.S. 2017/0353981 A1 titled "METHOD AND APPARATUS FOR SETUP OF WIRELESS COMMUNICATION", by Samsung Electronics Co., Ltd, filed on Jun. 5, 2017, discloses a method for setup of wireless communication of an IoT device. The method includes recognizing at least one terminal, for instance, a smartphone, present in the same space as the IoT device by measuring the round-trip time between the IoT device and the terminal. The IoT device powers on and, for example, operates in software-enable access point (AP) mode or starts a device discovery operation. The terminal runs an application for providing a Wi-Fi setup service for the IoT device, and, for example, adds and discovers the IoT device in case the IoT device is operating in AP mode. Then, the IoT device sends a request for AP information to the terminal that displays a popup window to receive a setup verification (AP selection and password) from the user. Upon receiving from the terminal, the required information for connecting to AP, which can be encrypted with IoT device's public key or not, the IoT device attempts a connection. Document U.S. 2017/0353981 A1 also does not cover genuineness verification of the IoT device.

SUMMARY OF THE INVENTION

The present invention provides a novel method to setup/configure an IoT device to connect to an access point or master/controller device with the aid of a computational device (for example, a smartphone or a laptop with required hardware) while verifying its genuineness and providing secure exchange of the local network security settings and cryptographic keys. It may be used for configuration of IoT devices using any popular IoT communication protocol that use security settings such as PSK or passcode. According to the present invention and in order to provide a better understanding, scenarios specific to Wi-Fi technology (IEEE 802.11 standard) are disclosed. However, as mentioned before, other popular IoT protocols such as Bluetooth can also be used during configuration. In order to setup an IoT device, the user would just need to scan a QR code in the mobile application and power on the IoT device. The rest of the process is automatically performed securely by the software elements involved in the invention. This way, the invention improves usability, in comparison to other popular configuration techniques and also provides high level of security to the process. The present invention also avoids popular vulnerabilities related to device configuration which are commonly found in Internet of Things devices, such as default pairing keys/WPA2-PSK known to public, clear text passcode shipped with device, weak passwords configured by users, vulnerable webservers/webpages hosted on IoT devices, Wi-Fi hotspot enabled by resource constrained IoT devices.

In order to configure an IoT device, the user needs to scan a QR code, which is shipped together with the device, using a mobile application, which contains wireless network settings of the router, such as network name and corresponding password, and other configuration preferences. The QR code contains identifiers of the device, randomly generated wireless network settings (SSID and WPA2-PSK), to which a device expects to connect during setup, and the manufacturer's digital signature over data part. Once the QR code is scanned, the mobile application decodes and extracts the information contained therein. The application checks the information in the QR code by validating the digital signature and enables a Wi-Fi hotspot on the smartphone using the wireless network settings (SSID and WPA2-PSK) extracted from QR code. The user then needs to power on the IoT device, which connects to the hotspot on the smartphone when it completely boots. The mobile application securely sends wireless network settings of the router (network name and WPA2-PSK) to the IoT device and the IoT device uses them to connect to the router. A device configuration key is securely sent to the IoT device to be used by it to decrypt the commands for further configuration. In this way, the present invention provides a method for secure configuration of the IoT device with minimum effort from the user.

The method of the present invention employs a digital certificate encoded on a QR code shipped with the device, in order to guarantee the authenticity of the unique elliptic curve public key, associated to the device, and that is used in a key transport protocol.

The proposed method can be applied to most of the IoT products such as SmartThings, Connect Home, Smart Cameras, Smart TVs, Sound bars, Smart fitness bands and other smart home appliances. Additionally, a solution based on the present invention can be provided as a service to other companies for configuration of their products such as Amazon Echo, TP-Link Smart Bulb, Google home, Philips hue, Belkin Wemo.

BRIEF DESCRIPTION OF THE DRAWINGS

The objectives and advantages of the current invention will become clearer through the following detailed description of the example and non-limitative figures presented at the end of this document, wherein.

DETAILED DESCRIPTION

Figure 1A:
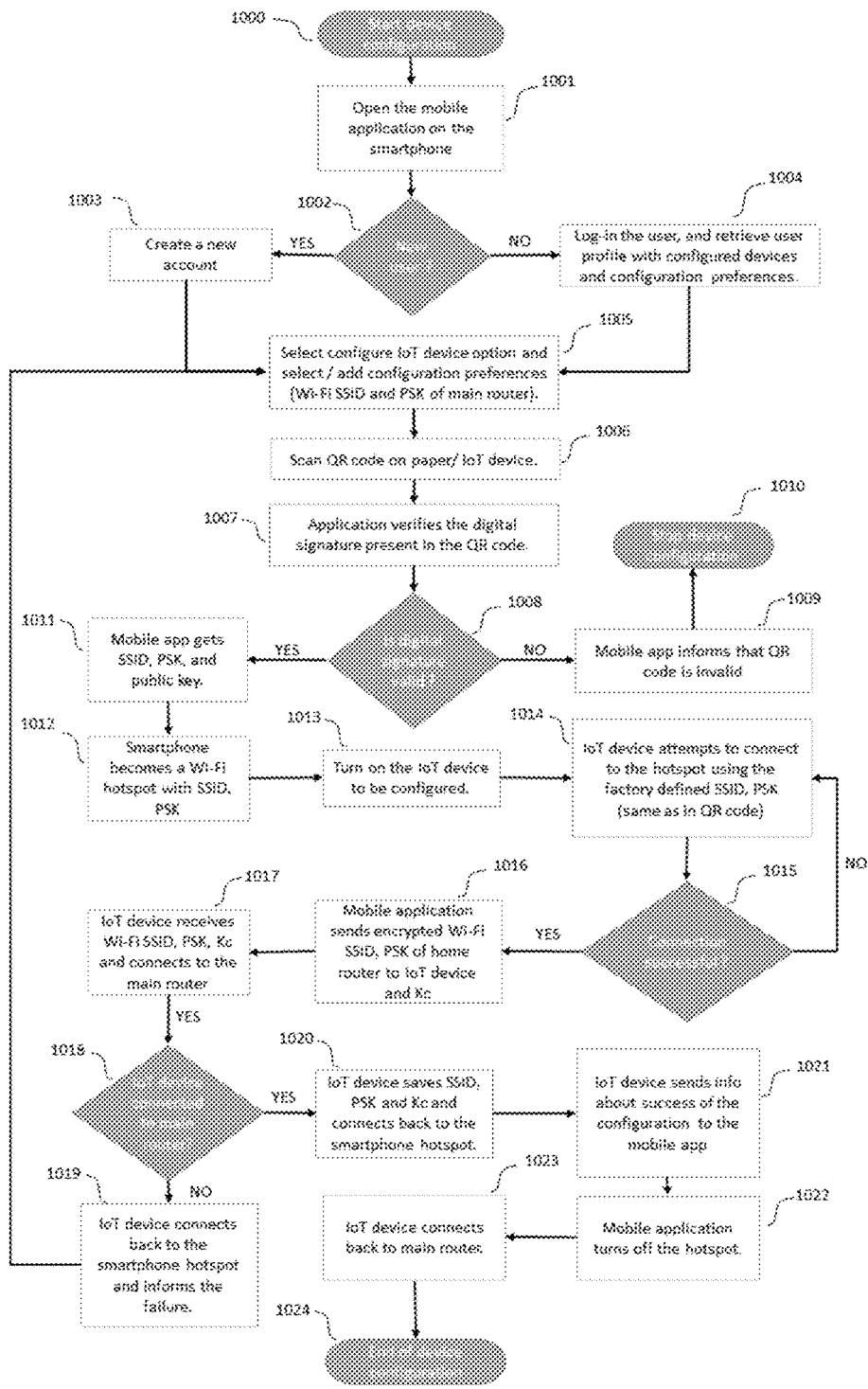
FIG. 1A discloses a flowchart of the proposed secure method to configure an IoT device easily using Wi-Fi technology.

FIG. 1A illustrates the flowchart of the proposed method to configure Internet of Things (IoT) device. The initial configuration starts (1000) by opening the mobile application on the smartphone (1001). First, it is verified if the user is new (1002) or if the user already has an account on the application. If the user does not have an account yet, the user creates a new account (1003) and selects the "Configure IoT device" option on the mobile application. It will allow the user to add his device configuration preferences such as Wi-Fi SSID (Service Set IDentifier) and PSK (pre-shared key) of the router (1005). The profile information and Wi-Fi SSID and PSK can be stored securely on the cloud service and/or in the secure storage of the smartphone. If the user already has an account, he can simply log-in using his user id and password. Upon successful log-in, the user profile, the previously configured devices and the configuration preferences are retrieved and displayed to the user (1004). Subsequently, the user selects pre-existing configuration preferences or adds new preferences (1005). It allows the user to scan the Quick Response code (QR code), which is either printed on the device itself or provided separately on a paper (1006).

The QR code represents a structure similar to a digital certificate which comprises of information about the device such as model number, serial number, a unique randomly-generated Wi-Fi Service Set Identifier (SSID), a unique randomly generated Wi-Fi Protected Access-2 Pre Shared Key (WPA2-PSK), a unique Elliptic Curve public key of the IoT device, and, finally, a device manufacturer's digital signature over the aforementioned data in this QR code. The digital signature must be based on Elliptic Curve Digital Signature Algorithm (ECDSA), because of its smaller signature and key size, while providing equivalent security as compared to other popular digital signature schemes with much larger keys. This way, smaller QR code is generated. The purpose of the digital signature is to assure the device manufacturer is the author of all the information contained in the QR code and that it was not tampered with by an attacker.

The private key corresponding to the public key of the IoT device present in the QR code is securely embedded in the IoT device under configuration. Once the QR code is properly scanned, the mobile application decodes it and extracts the information contained therein. After the successful decoding, the verification of the device manufacturer's digital signature (1007) is performed (which includes validation of the certificates involved in the certificate chain, starting from the manufacturer's intermediate certificate(s) till the root certificate, in case the structure comprises more than one level of Certification Authority), thus validating the information contained in the QR code. In addition, if the device is able to decrypt a message encrypted with this public key, it would prove the genuineness of the device, since only the holder of the private key would be able to do that. If the digital signature is not valid (1008), the mobile application informs the user that it could not verify the QR code (1009) and stops the device configuration (1010). Contrarily, if the digital signature is found valid, the mobile application gets (1011) the SSID, the WPA2-PSK, and the public key of the IoT device from the decoded QR code information, configures the Wi-Fi hotspot of the device using the SSID and WPA2-PSK obtained from the previous step and enables it (1012).

If the Wi-Fi hotspot configuration is successful, the mobile application displays the instructions, so that the user can turn on the IoT device under configuration (1013). On successful boot of the IoT device, if factory configuration is detected, it tries to connect to Wi-Fi hotspot (1014) using the pre-configured SSID and the WPA2-PSK (same as on QR code) until it finally connects successfully (1015). When the mobile application detects that the IoT device is connected to the hotspot, it sends a random packet key (Kp), encrypted with the device's public key, Wi-Fi SSID and PSK of the router, where the IoT device has to be finally connected, and the random configuration key (Kc) to the mobile application for future configurations (encrypted using the Kp) (1016).

Once the IoT device receives the encrypted random packet key and the encrypted Wi-Fi SSID and PSK, it decrypts the random packet key using its private key corresponding to its public key on the QR code. Then, using the random packet key, it decrypts the Wi-Fi SSID and PSK of the router, as well as the configuration key (Kc). In case of any error during decryption, the IoT device sends an error message to the mobile application, which attempts to encrypt and send again. If the process still fails, the device powers off and the configuration ends. Finally, the IoT device attempts to connect to the router using the Wi-Fi SSID and PSK received in the previous step (1017). If the IoT device is unable to connect to the router (1018), it connects back to the smartphone's Wi-Fi hotspot and informs the application about the failure (1019) and it powers off. This way the mobile application informs the user to check if the router is switched-on and the Wi-Fi SSID and PSK are correct. Following this, the user is directed to the initial configuration screen of the mobile application, where the user corrects/sets the configuration preferences (1005) and continues with the configuration process. Conversely, if the IoT device is able to connect with the router successfully, it saves this configuration and connects back to the smartphone hotspot (1020). Once it is connected to the smartphone hotspot, it sends a success message to the mobile application. The application securely saves the IoT device information and its configuration key (Kc) on the cloud and/or locally in the secure area of the smartphone. The application also notifies the user (1021) about the success of the configuration. Subsequently, the mobile application turns off the smartphone's hotspot (1022) and the IoT device connects back to the router (1023). Then, the successful configuration of the device (1024) is finished.

The mobile application also allows the user to securely save the digital certificate represented by the QR code shipped with the configured device, in its secure storage for the future use.

The method also allows secure reconfiguration of the device. It is done by logging in the mobile application, which may be connected to the cloud service by selecting the pre-configured device in the mobile application logged in with the previous profile, then select to reconfigure the device. The user needs to press the connect button on the device, which allows the device to connect to its default hotspot (same as the QR code) created by the mobile application during reconfiguration. The mobile application uses the random configuration key (Kc) of the device to encrypt the data exchanged for the reconfiguration using an authenticated encryption algorithm. It provides data origin authentication and avoids unauthorized reconfiguration. User selects "Remove device" button to change the ownership of the device, which sends a restore command to the device encrypted using the configuration key. This process restores the device configuration to the factory settings and any other user can gain ownership of the device using the manufacturer's mobile application.

Figure 1B:
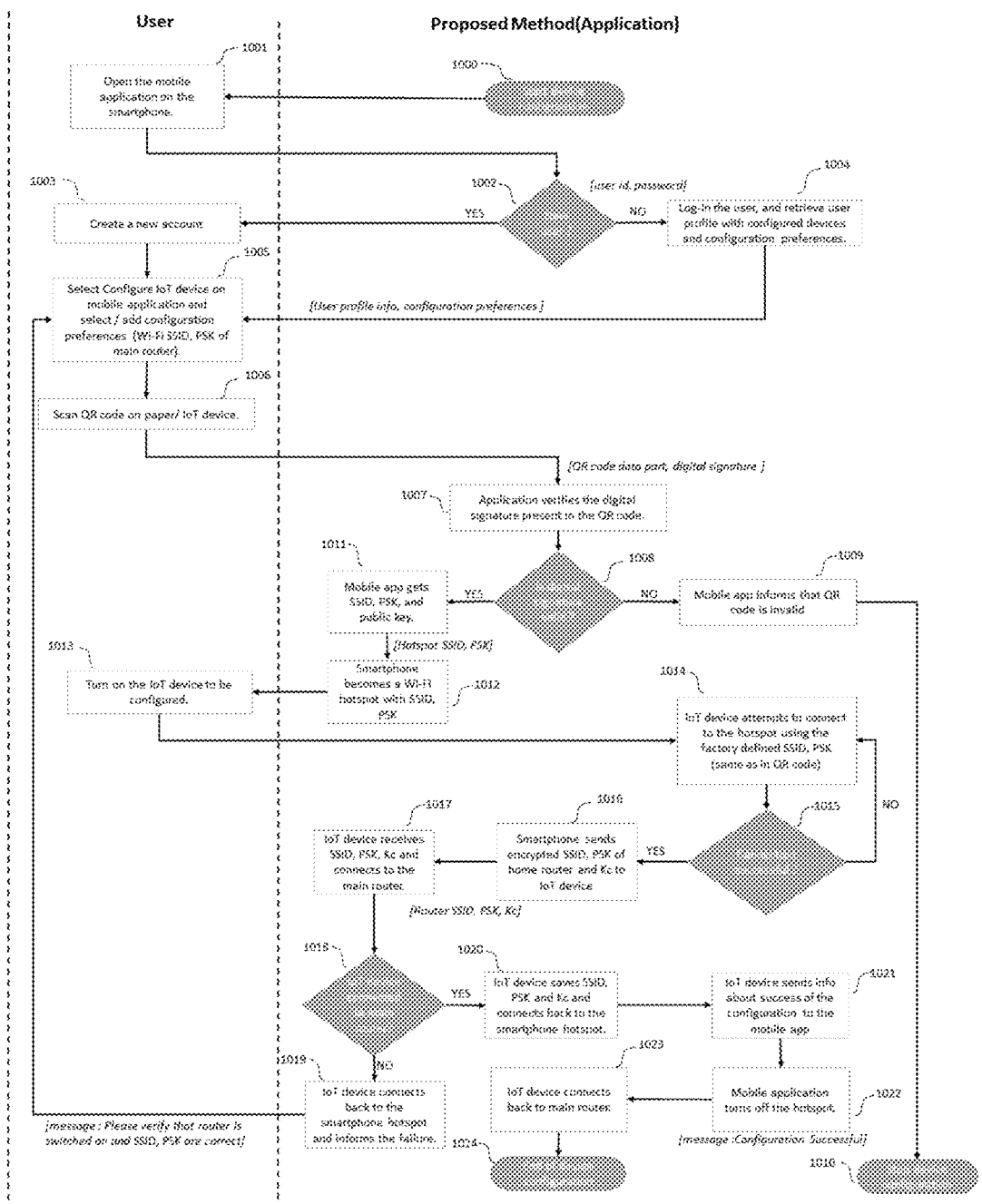
FIG. 1B discloses a complementary dataflow chart illustrating regular use of the proposed method (user actions and automatic/app tasks).

The method of the present invention provides the guarantee to the user that the device is genuine and adds security to device configuration. Furthermore, the proposed method also provides high level of security without giving additional trouble to the user and is simple to use. FIG. 1B illustrates the complementary dataflow chart, which shows that most of user's work is to create an account and set the configuration preferences. Other than this, the user just needs to scan the QR code on the device and all other steps are performed by the mobile application based on the proposed method of configuration.

Figure 2A:
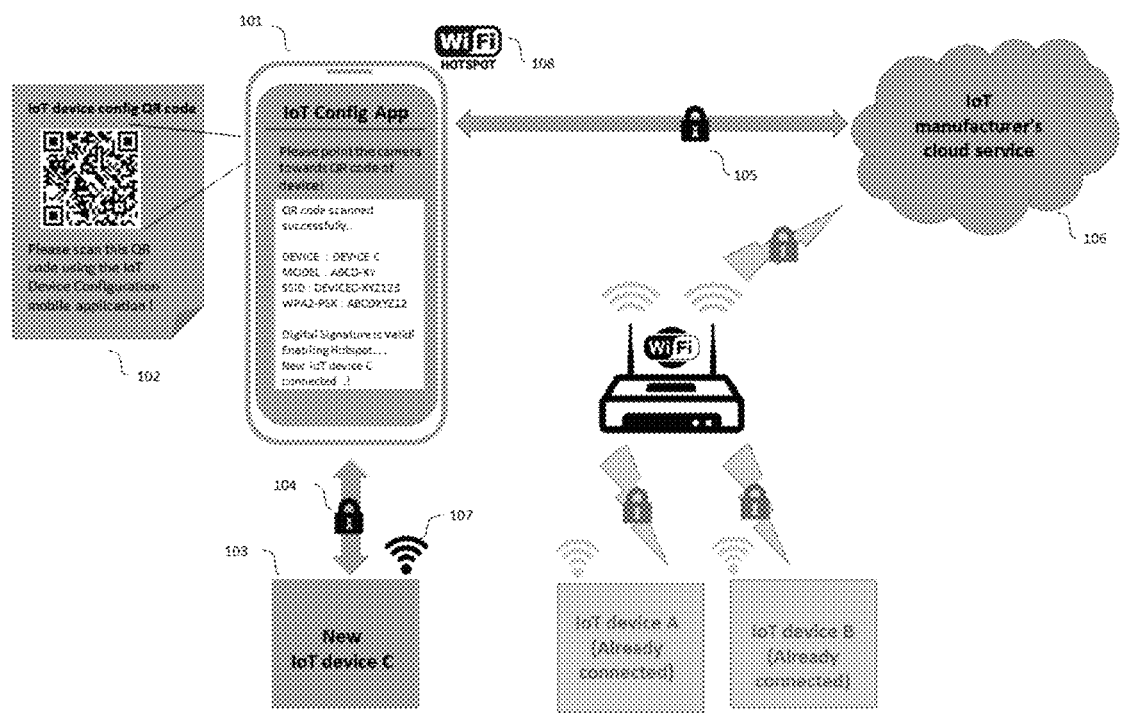
FIG. 2A discloses an illustrative scenario of the proposed method to configure a new IoT device using a smartphone.

FIG. 2A illustrates the usage scenario for proposed method (1000) to configure a new IoT device (103) using a smartphone (101) with the IoT device configuration mobile application installed, which automates most of the steps of the proposed method. Once the user has added the configuration preferences after a successful login to his account on the cloud service (106) using secure communication channel (such as properly configured TLS) (105), the user is able to scan the QR code printed on paper (102) shipped together with the device. After the QR code is scanned, the mobile application decodes the data contained in the QR code, verifies the digital signature, and automatically enables a Wi-Fi hotspot (108) on the smartphone (101), based on the information retrieved from the QR code [steps 1007-1013]. Then, the mobile application informs the user to switch on the IoT device (103). Once the IoT device (103) is turned on and boots completely, it connects to the hotspot (108) on the smartphone (101) using the default Wi-Fi SSID and PSK saved in its memory (which are the same as on the QR code) [step 1014]. The mobile application sends a random packet key (Kp) encrypted using IoT device's public key retrieved from QR code and wireless network settings and Kc (configuration key) of the router encrypted using Kp, (hence improving security of credential transfer (104)), to the IoT device (103) [step 1016]. The IoT device uses its private key (corresponding to its public key) to decrypt the Kp and uses Kp to decrypt the Wi-Fi SSID, PSK and Kc. Only a genuine device from the manufacturer would be able to successfully perform this operation. Hence, the proposed method guarantees the genuineness of the IoT device (103).

Figure 2B:
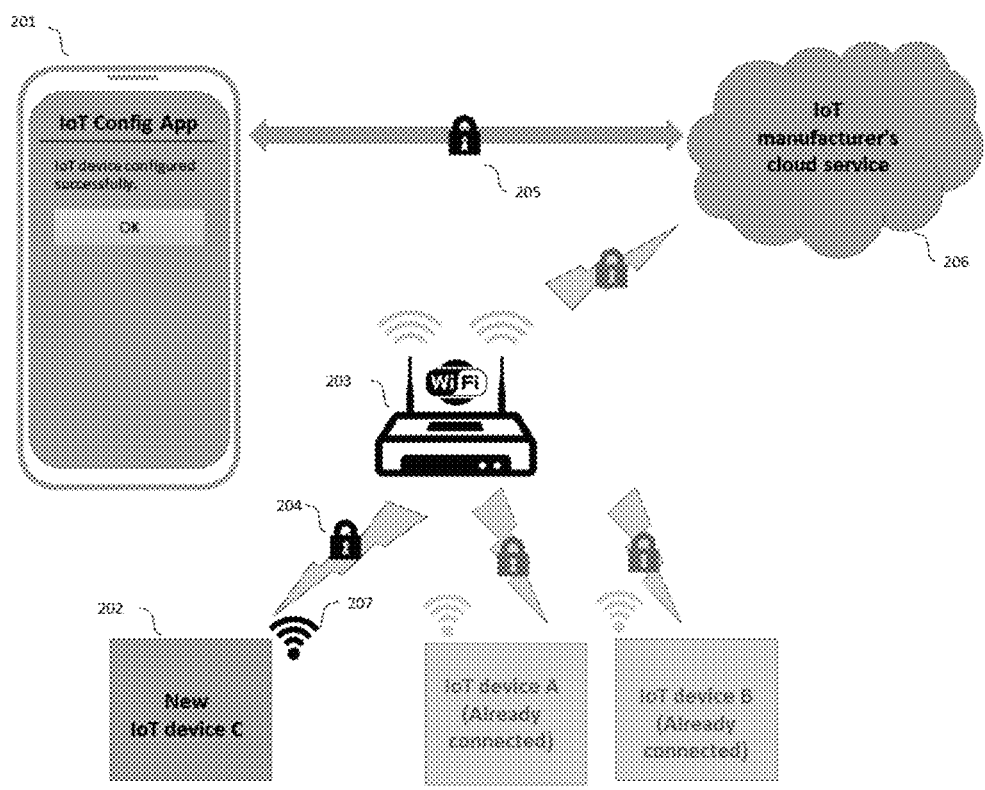
FIG. 2B discloses an illustrative scenario of successful configuration of IoT device using the proposed method.

FIG. 2B illustrates the scenario of successful configuration. Once the Wi-Fi SSID and PSK are decrypted successfully as previously explained, the IoT device (202) disconnects the Wi-Fi connection with the smartphone (201) and uses the decrypted Wi-Fi SSID and PSK to connect to the router (203) [step 1017]. Upon successful connection with router (203) the IoT device (202) saves the Wi-Fi SSID, PSK of the router (203) and Kc (configuration key) in its secure storage and on the IoT manufacturer's cloud (206) account using secure communication (205). Then, it connects back to the smartphone (201) [step 1020]. It then sends information about successful connection with the router (203) to the smartphone (201) [step 1021]. The mobile application turns off the Wi-Fi hotspot and informs the user that the IoT device is successfully configured [step 1022]. Finally, IoT device (202) connects back to the router (203) [step 1023]. The IoT device (202) is able to connect to the IoT manufacturer's cloud (206) service over secure communication (204) via the router (203).

Figure 3:
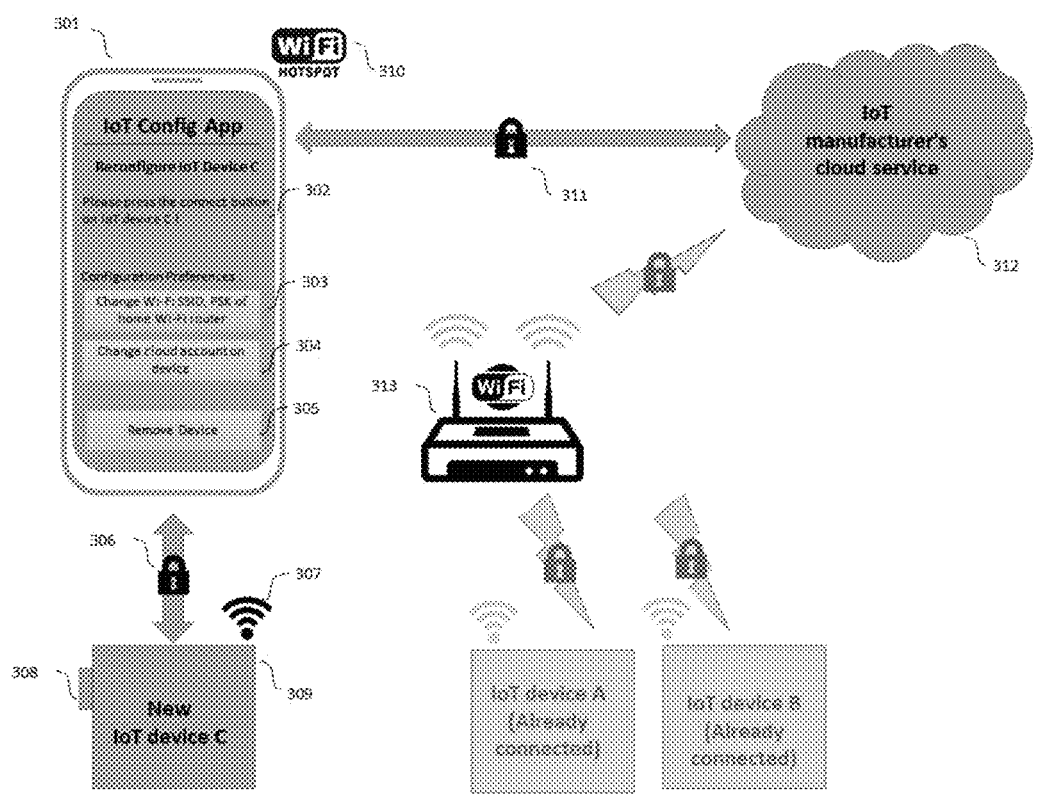
FIG. 3 discloses an illustrative scenario of the proposed method to reconfigure, a previously configured IoT device.

FIG. 3 illustrates a scenario of the proposed method to reconfigure an already configured IoT device (309). The user selects the reconfigure option for the corresponding IoT device in the mobile application on the smartphone (301). The mobile application launches another screen as shown in FIG. 3, enables Wi-Fi hotspot (310) using the IoT device's default Wi-Fi SSID and PSK, and asks (302) the user to press the connect button (308) on the IoT device (309). Once the connect button (308) is pressed, the IoT device (309) disconnects from the router (313) and connects to the Wi-Fi hotspot (310) on the smartphone using its Wi-Fi radio (307). Then, the mobile application gives the options to the user to reconfigure the IoT device (309), such as "Change Wi-Fi settings" of the router (303), "Change the cloud account" of the IoT device (304), and "Remove the IoT device" from the user account (305). The mobile sends corresponding commands encrypted using the configuration key (Kc) (306) to the IoT device (309). If the IoT device (309) is able to validate the authentication tag and decrypt the command using its copy of Kc, it performs the corresponding operation to the command. Subsequently, the mobile application sends the status of the operation based on the command to the IoT manufacturer's cloud service (312) over secure communication (311).

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

The invention claimed is:

1. A method for configuring Internet of Things (IoT) devices through wireless technologies comprising:
   user logging in on a manufacturer's configuration cloud service using secure communication channel or logging in the mobile application and adding or selecting an IoT device configuration preference;
   user scanning a Quick Response (QR) code on the IoT device or on a paper provided with the IoT device containing wireless network settings of a router by means of a camera of the mobile device;
   mobile configuration application decoding the QR code and verifying if a device manufacturer's digital signature contained therein is valid;
   if the QR code is invalid, the user is notified by the mobile device and the IoT device configuration is stopped;

if the QR code is valid, the mobile configuration application gets Service Set Identifier (SSID), Wi-fi Protected Access-2 Pre-Shared Key (WPA2-PSK) and public key of the IoT device from the decoded QR code information;

mobile configuration application setting the mobile device as a wi-fi hotspot with the SSID and WPA2-PSK retrieved from the verified digital certificate;

user turning on the IoT device to be configured;

the IoT device connecting to the Wi-Fi hotspot using the factory defined SSID, WPA2-PSK;

IoT device verifying if connection to hotspot was successful;

once the IoT device is connected to the mobile device's Wi-Fi hotspot, mobile configuration application sending to the IoT device a random packet key encrypted with the IoT device's public key, and Wi-Fi SSID and PSK of the router, and a random configuration key, encrypted with a packet key (Kp);

IoT device decrypting the random packet key using its corresponding private key and decrypting the Wi-Fi SSID and PSK of the router using the decrypted random packet key;

IoT device connecting to the router using the Wi-Fi SSID and PSK provided by the mobile configuration application;

if the connection is unsuccessful, IoT device connects back to the mobile device's Wi-Fi hotspot and informs the failure;

if the connection is successful, saving the IoT device information and its configuration key on the cloud and/or locally in the secure area of the mobile device;

IoT device sending information about success of the operation to the configuration mobile application/cloud service;

mobile configuration application turning off the hotspot; and

IoT device connecting back to the router.

2. The method according to the claim 1, wherein the QR code comprises model number, serial number, a unique randomly generated Wi-Fi Service Set Identifier (SSID), a unique randomly generated Wi-Fi Protected Access-2 Pre-Shared Key (WPA2-PSK), a unique Elliptic Curve public key of the IoT device, and, finally, a device manufacturer's digital signature over the aforementioned data in this QR code.

3. The method according to the claim 1, wherein the mobile configuration application enables a Wi-Fi hotspot on smartphone based on default random Wi-Fi SSID and PSK of IoT device, retrieved from validated QR code.

4. The method according to the claim 1, wherein the IoT device has a public/private key pair, in which the public key is given in the digital certificate, which is present in the QR code, and the private key is stored securely inside the IoT device.

5. The method according to the claim 1, wherein a secure reconfiguring is performed by the mobile device using the random configuration key of the device to encrypt the data exchanged for the reconfiguring using an authenticated encryption algorithm.

\* \* \* \* \*